United States Patent
Pankratz

(10) Patent No.: US 12,450,820 B2
(45) Date of Patent: Oct. 21, 2025

(54) EMULATING ORIENTED BOUNDING BOXES IN BOUNDING VOLUME HIERARCHIES

(71) Applicant: ATI Technologies ULC, Markham (CA)

(72) Inventor: David William John Pankratz, Markham (CA)

(73) Assignee: ATI Technologies ULC, Markham (CA)

(*) Notice: Subject to any disclaimer, the term of this patent is extended or adjusted under 35 U.S.C. 154(b) by 343 days.

(21) Appl. No.: 18/090,381

(22) Filed: Dec. 28, 2022

(65) Prior Publication Data
US 2024/0221283 A1   Jul. 4, 2024

(51) Int. Cl.
*G06T 15/06* (2011.01)
*G06T 15/08* (2011.01)
*G06T 17/00* (2006.01)

(52) U.S. Cl.
CPC .......... *G06T 15/06* (2013.01); *G06T 15/08* (2013.01); *G06T 17/005* (2013.01); *G06T 2210/12* (2013.01); *G06T 2210/21* (2013.01)

(58) Field of Classification Search
CPC ....... G06T 15/06; G06T 15/08; G06T 15/005; G06T 15/10; G06T 15/80; G06T 17/005; G06T 17/05; G06T 17/10; G06T 17/20; G06T 2210/12; G06T 2210/21
See application file for complete search history.

(56) References Cited

U.S. PATENT DOCUMENTS

| | | | |
|---|---|---|---|
| 10,839,475 B2 * | 11/2020 | Benthin | G06F 9/3877 |
| 11,854,138 B2 * | 12/2023 | Chajdas | G06T 17/005 |
| 12,079,919 B2 * | 9/2024 | Oldcorn | G06T 11/20 |
| 2019/0318445 A1 | 10/2019 | Benthin et al. | |
| 2022/0020200 A1 | 1/2022 | Fenney | |
| 2023/0027725 A1 * | 1/2023 | Chajdas | G06T 17/005 |
| 2023/0099806 A1 | 3/2023 | Oldcorn et al. | |

OTHER PUBLICATIONS

Schneider, P. J. & Eberly, D. H., "Oriented Bounding Box", Geometric Tools for Computer Graphics, Science Direct, 2003, 22 pgs., downloaded from: https://www.sciencedirect.com/topics/computer-science/oriented-bounding-box on Sep. 29, 2021.

* cited by examiner

Primary Examiner — Vijay Shankar
(74) Attorney, Agent, or Firm — Volpe Koenig

(57) ABSTRACT

A technique for performing ray tracing is provided. The technique is applied to a bounding volume hierarchy which comprises a plurality of oriented bounding boxes. The oriented bounding boxes are emulated by translating each oriented bounding box into two or more volumes. After the emulating step, the bounding volume hierarchy is traversed. In some examples, the regular shapes or volumes comprise axis-aligned bounding boxes, cubes or anisotropic rectangles. In one example, the emulating step is performed at run-time using dedicated hardware.

20 Claims, 7 Drawing Sheets

EMULATING ORIENTED BOUNDING BOXES IN BOUNDING VOLUME HIERARCHIES

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

The dominant acceleration structure for ray tracing is the Bounding Volume Hierarchy (BVH) that uses axis-aligned bounding boxes. Axis-aligned bounding boxes have the limitation that they do not conform well to rotated geometries which are prevalent in ray tracing workloads. An alternative to axis-aligned bounding boxes are oriented bounding boxes that may be rotated to conform to the underlying primitive. However, oriented bounding box ray intersection tests require additional data and calculations as compared to axis-aligned bounding box intersection tests. In addition, inclusion of oriented bounding box intersection hardware comes at a high area cost. This disclosure captures benefits of oriented bounding boxes while avoiding their downsides.

BRIEF DESCRIPTION OF THE DRAWINGS

A more detailed understanding may be had from the following description, given by way of example in conjunction with the accompanying drawings wherein.

DETAILED DESCRIPTION

A technique for performing ray tracing is provided. The technique is applied to a bounding volume hierarchy which comprises a plurality of oriented bounding boxes. The oriented bounding boxes are emulated by translating each oriented bounding box into N regular shapes or volumes, wherein N is greater than 1. After the emulating step, the bounding volume hierarchy is traversed. In some examples, the regular shapes or volumes comprise axis-aligned bounding boxes, cubes or anisotropic rectangles. In one example, the emulating step is performed at run-time using dedicated hardware.

Figure 1:
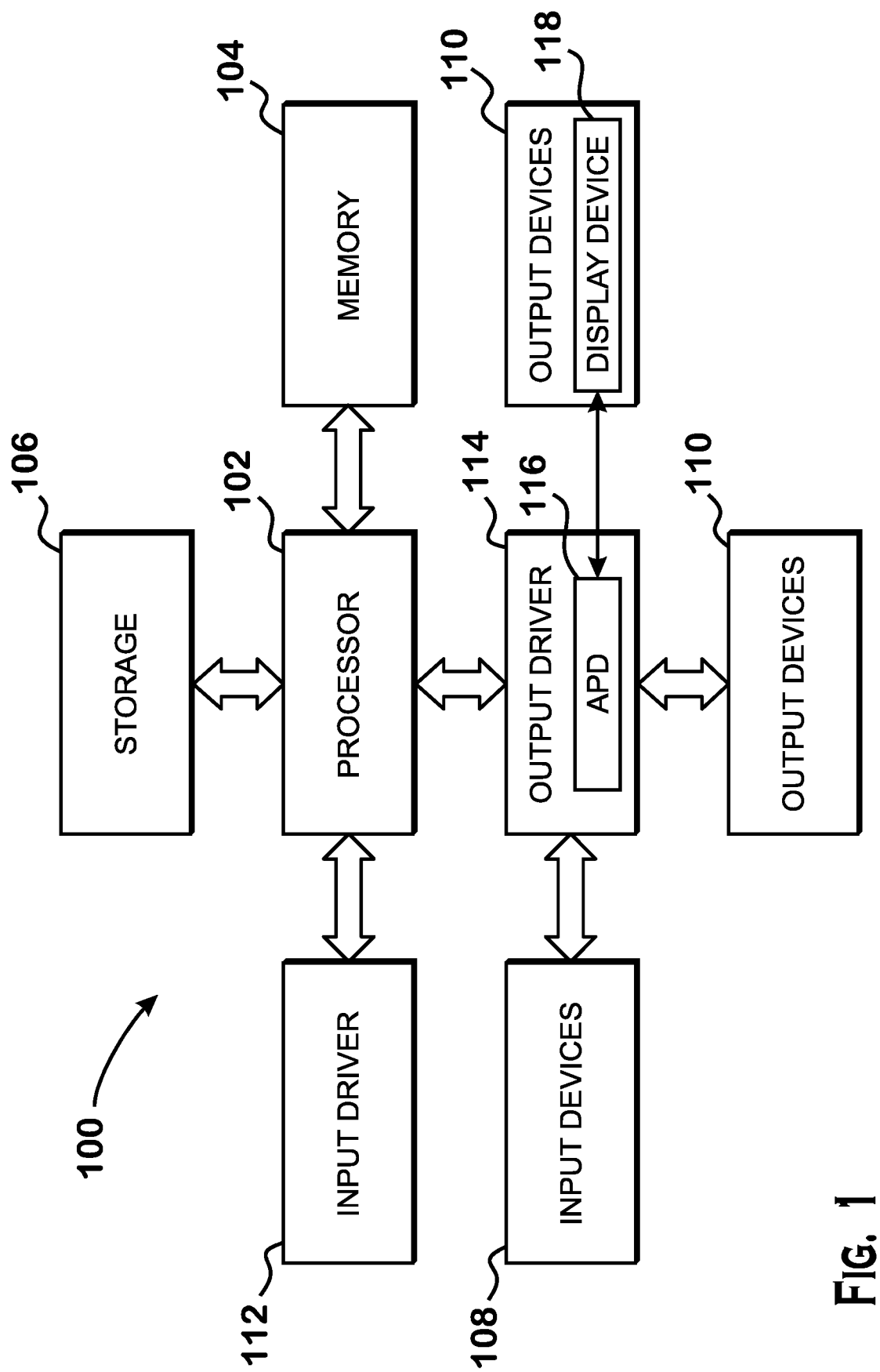
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
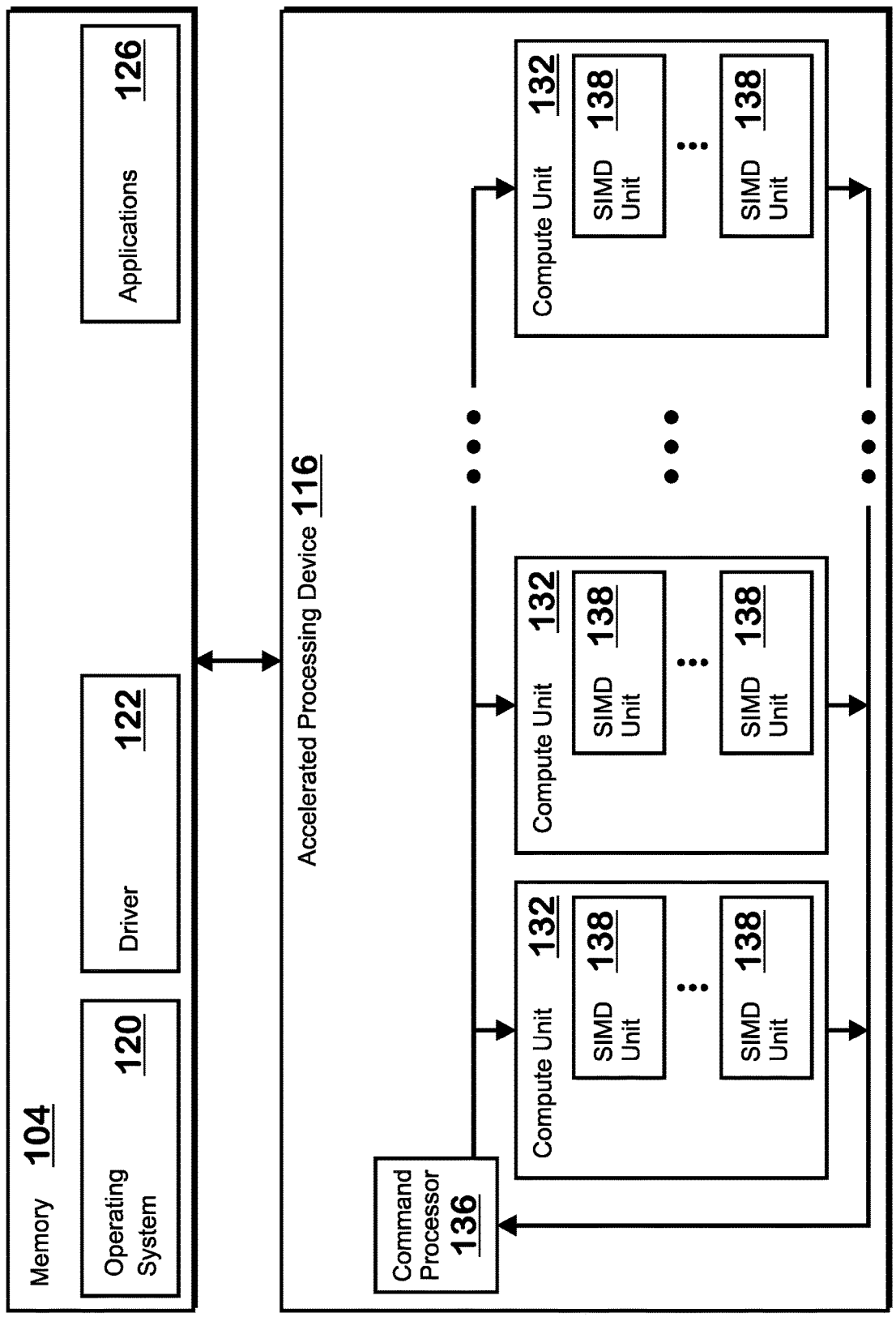
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 (together, parallel processing units 202) that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
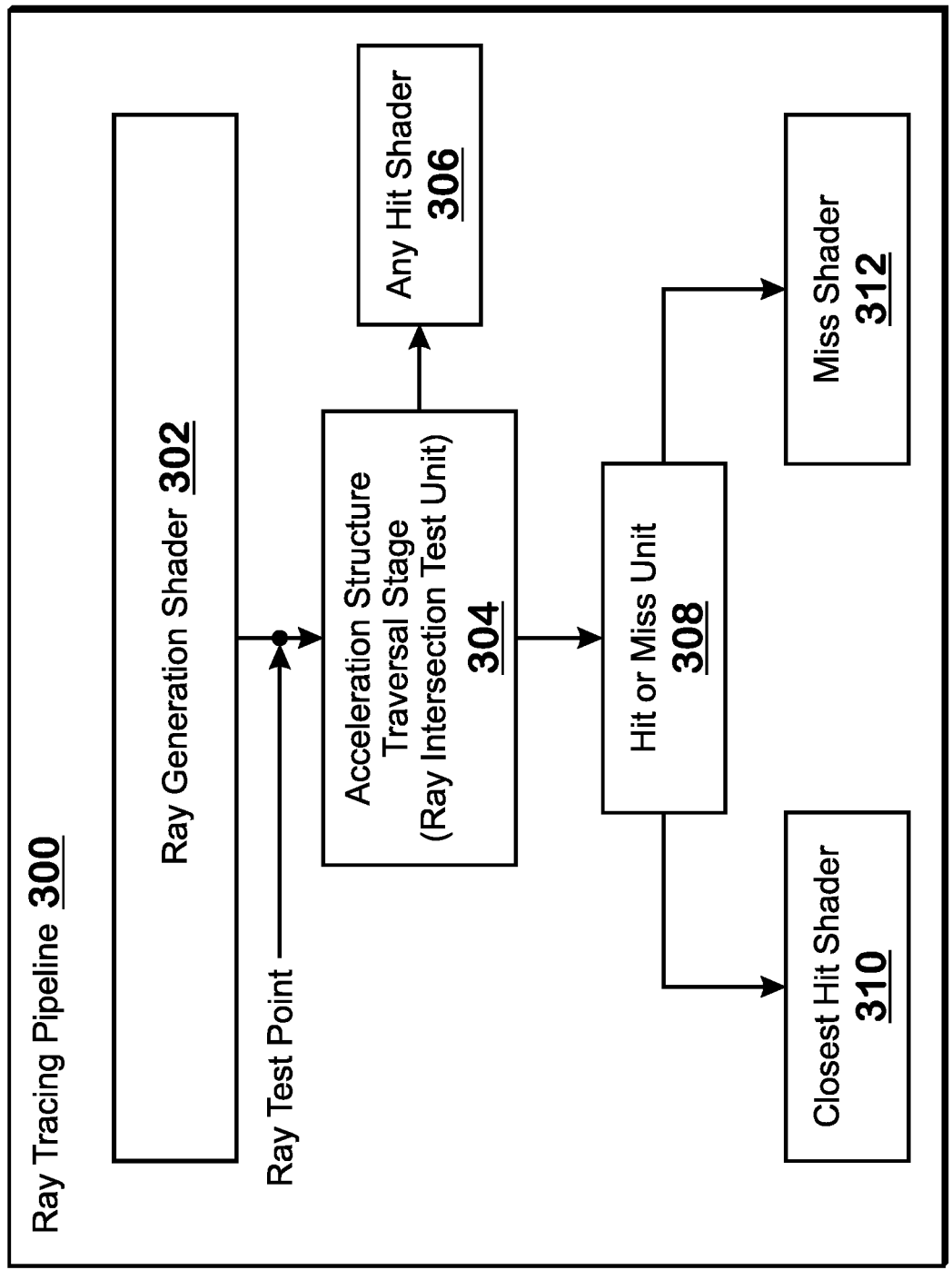
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is precompiled by an application compiler and/or compiled by the driver 122). The acceleration structure traversal stage 304 performs a ray intersection test to determine whether a ray hits a triangle.

The various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 may be orchestrated partially or fully in software or partially or fully in hardware, and may be orchestrated by the processor 102, the scheduler 136, by a combination thereof, or partially or fully by any other hardware and/or software unit. The term "ray tracing pipeline processor" used herein refers to a processor executing software to perform the operations of the ray tracing pipeline 300, hardware circuitry hard-wired to perform the operations of the ray tracing pipeline 300, or a combination of hardware and software that together perform the operations of the ray tracing pipeline 300.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For non-opaque triangles that are hit, the ray tracing pipeline 300 may trigger execution of an any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader.

Note, it is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for the closest hit shader 310 or the miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parent, and so on. Leaf nodes represent a triangle against which a ray test can be performed. It should be understood that where a first node points to a second node, the first node is considered to be the parent of the second node.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
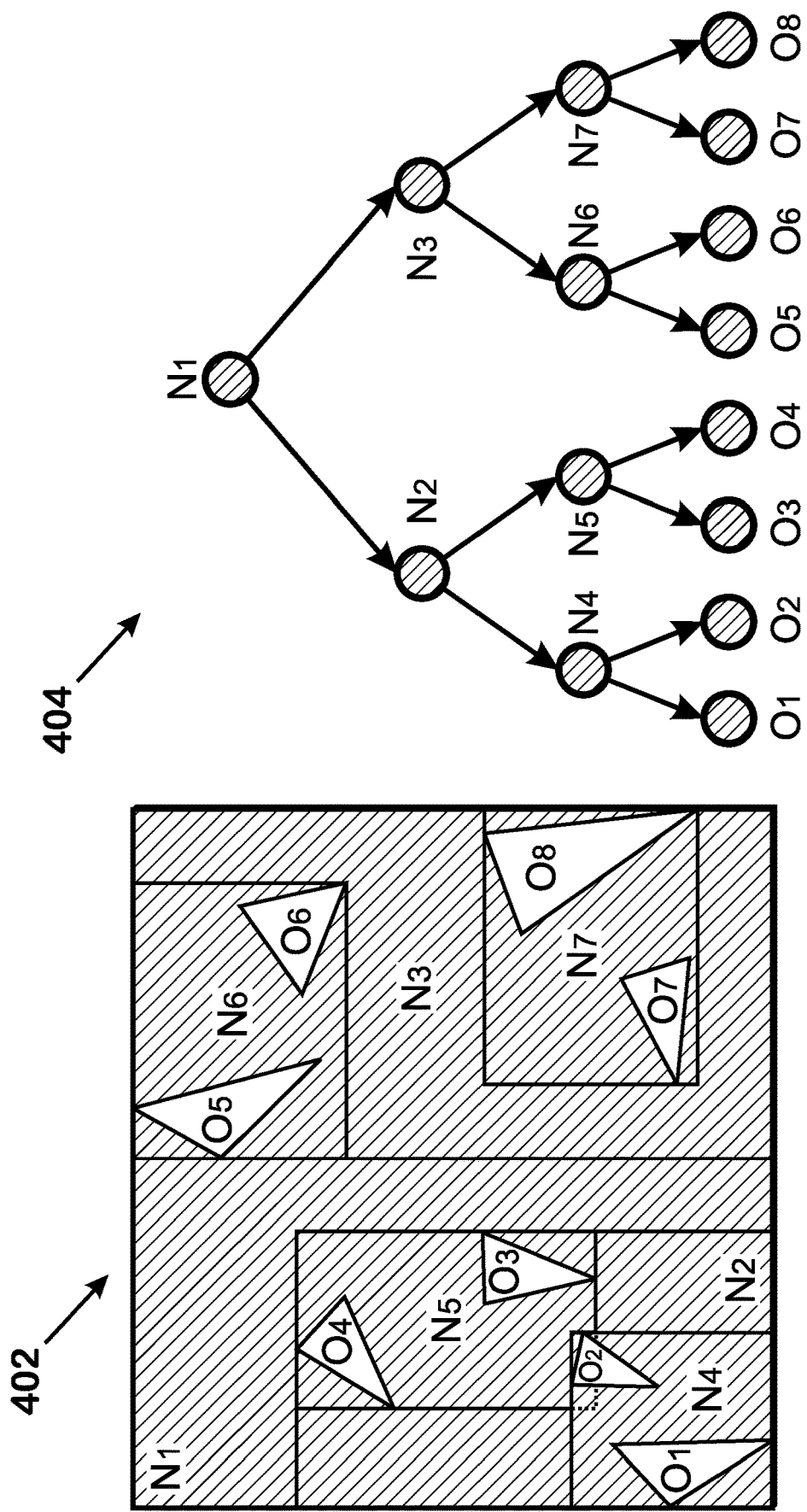
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated on the top side of FIG. 4 and the tree representation 404 of the bounding volume hierarchy is illustrated on the bottom side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node.

In an example, the ray intersects $O_5$ but no other triangle. The test would test against $N_1$, determining that that test succeeds. In this example, the test would test against $N_2$, determining that the test fails. The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails. Instead of testing 8 triangle tests, two triangle tests ($O_5$ and $O_6$) and five box tests ($N_1$, $N_2$, $N_3$, $N_6$, and $N_7$) are performed. Note that rays can have a variety of directions and can have an origin in a variety of locations. Thus, the specific boxes eliminated or not eliminated would depend on the origin and direction of the rays. However, in general, testing the rays for intersection with boxes eliminates some leaf nodes from consideration.

Figure 5:
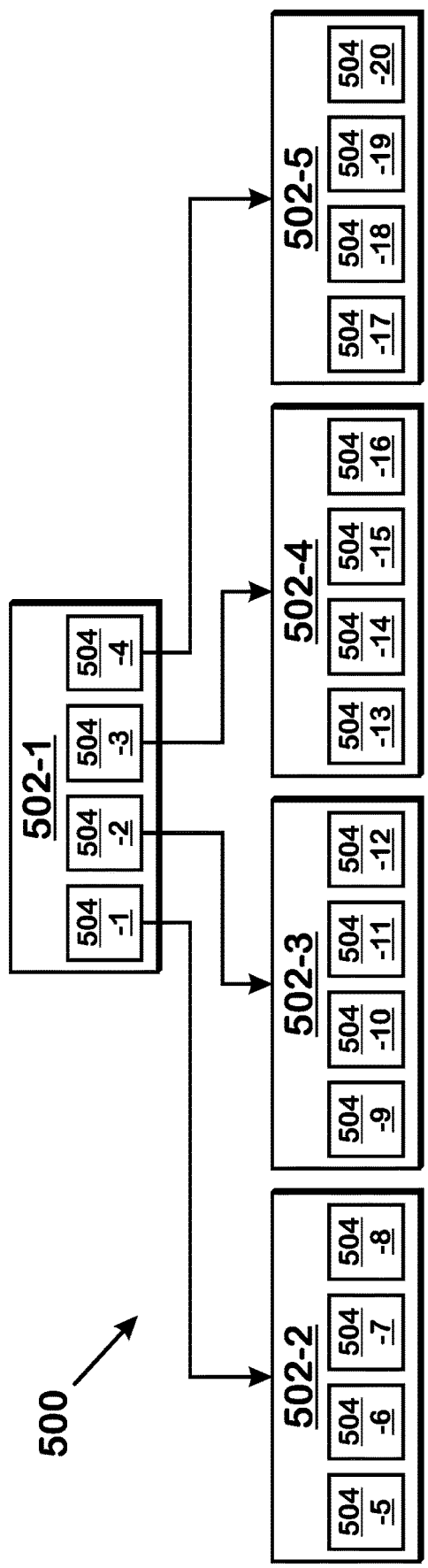
FIG. 5 illustrates a portion of a bounding volume hierarchy, according to an example.
Figure 6:
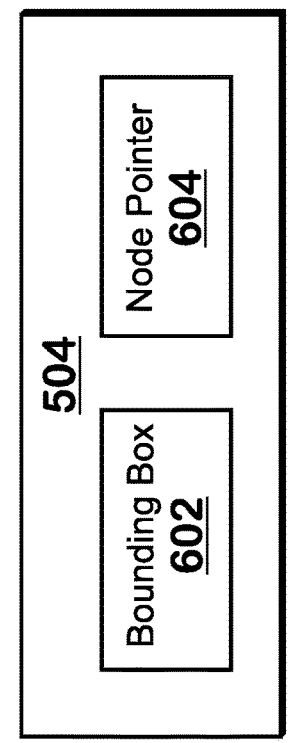
FIG. 6 illustrates details of a box data item, according to an example.

FIG. 5 illustrates a portion of a bounding volume hierarchy 500, according to an example. The portion of the bounding volume hierarchy 500 that is illustrated includes a number of box nodes 502. Each box node 502 includes box data items 504. As shown in FIG. 6, each box data item 504 includes a bounding box 602 and a node pointer 604. The node pointer 604 points to another node 502 and the bounding box 602 specifies a bounding box that tightly bounds the geometry of the pointed to node 502 (that is, the triangle(s) and/or bounding boxes of the pointed-to node 502 and children thereof). This configuration allows traversal of the bounding volume hierarchy 500 to occur by iteratively processing nodes 502 of the bounding volume hierarchy 500. Processing a box node in this manner includes testing the bounding boxes 602 of the box data items 504 of the box node for intersection with a ray. For each bounding box 602 intersected by the ray, the ray tracing pipeline 300 traverses to the box node 502 pointed to by the corresponding node pointer 604 (e.g., the node pointer in the same box data item 504 as the bounding box 602 determined to be intersected by the ray).

Figure 7A:
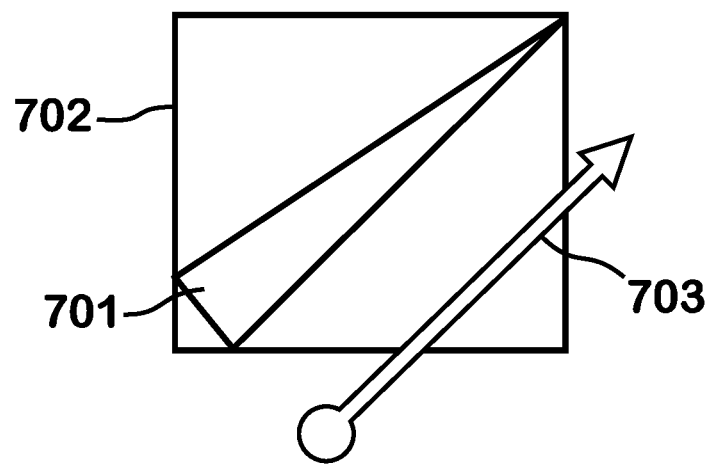
FIGS. 7A, 7B and 7C are geometries illustrating the emulation of an oriented bounding box using axis-aligned bounding boxes, according to an example.
Figure 7B:
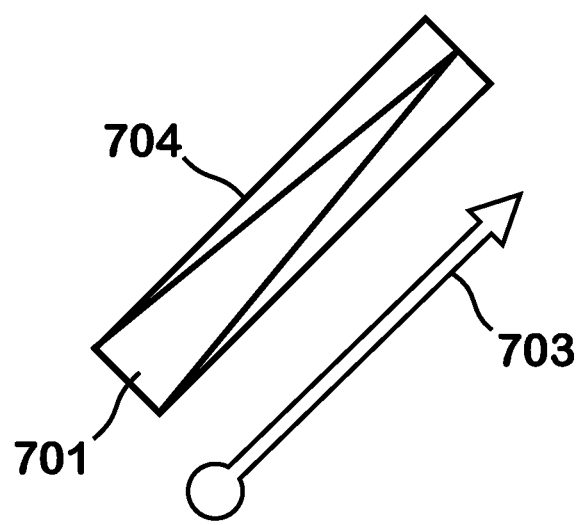

Referring back to FIG. 4, in an example, the triangles shown as $O_1$, $O_2$, $O_3$, $O_4$, $O_5$, $O_6$, $O_7$, and $O_8$ represent oriented bounding boxes that have been rotated to conform to the specific geometry of each triangle. Such oriented bounding boxes require additional silicon area and a longer pipeline for intersection tests than axis-aligned bounding boxes. Oriented bounding boxes provide certain benefits, such as removing false positives that occur with poorly fit bounding boxes. In the example of FIG. 7A, an axis-aligned bounding box 702 is poorly fit to the area of triangle 701. This approach can result in a false positive if, for example, during tracing, ray 703 intersects axis-aligned bounding box 704 without also hitting triangle 701. FIG. 7B illustrates how such a false negative result would have been avoided had triangle 701 been represented using oriented bounding box 704 because in that instance ray 703 completely misses oriented bounding box 7B.

Figure 7C:
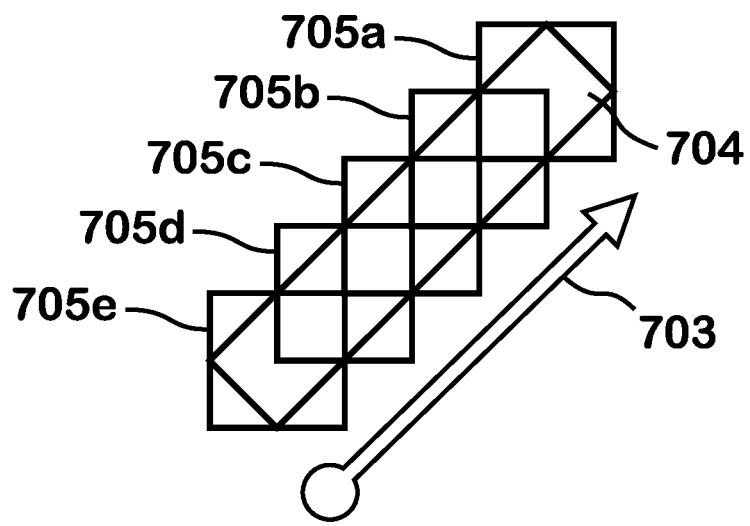

FIG. 7C illustrates a further alternative, where oriented bounding box 704 from FIG. 7B is emulated using five axis-aligned bounding boxes 705a, 705b, 705c, 705d and 705e. The false negative result (from FIG. 7A) is avoided when axis-aligned bounding boxes 705a, 705b, 705c, 705d and 705e are used to emulate oriented bounding box 704 because, as shown in FIG. 7C, ray 703 fails to intersect any of axis-aligned bounding boxes 705a, 705b, 705c, 705d and 705e. The emulation approach shown in FIG. 7C captures benefits of oriented bounding boxes while avoiding the additional silicon area and longer pipeline for intersection tests associated with oriented bounding boxes.

In one example, oriented bounding boxes are emulated using existing axis-aligned bounding box intersection hardware, obviating the need for dedicated oriented bounding box intersection hardware that comes at a high area cost, while still capturing the performance benefits (e.g., reduced false positives) associated with oriented bounding box processing. In this example, each axis-aligned bounding box in a bounding volume hierarchy references a unique subtree, as shown for example in nodes $N_1$-$N_7$ in FIG. 4. When a ray intersects an axis-aligned bounding box, traversal continues into the child subtree. If the geometries associated with $O_1$-$O_8$ that are poorly fit to axis-aligned bounding boxes were to be represented using axis-aligned bounding boxes (e.g., as shown in FIG. 7B) a performance penalty due to false-positive traversals into the subtrees would occur. Conversely, if the geometries associated with $O_1$-$O_8$ were to be represented using oriented bounding boxes, the false-positive traversal steps would be reduced at the cost of increased hardware area. A further approach uses an alternative structure where multiple axis-aligned bounding boxes (e.g., axis-aligned bounding boxes 705a, 705b, 705c, 705d and 705e) reference the same subtree. In the case where $O_1$-$O_8$ are each represented with multiple axis-aligned bounding boxes, the subtree for each is simply the triangle itself. However, in other examples, the bounding box for a non-leaf node N is represented with multiple axis-aligned bounding boxes. The subtrees for each such non-leaf nodes includes the descendants of that non-leaf node. For example, the subtree of $N_2$ includes nodes $N_4$ and $N_5$, the children of those nodes, and so on. The fact that multiple axis-aligned bounding boxes reference the same subtree means that if the ray intersects any such axis-aligned bounding box, then the ray tracing pipeline 300 traverses to the same subtree. In other words, if the ray intersects any of the multiple axis-aligned bounding boxes that replace an oriented bounding box, then the ray tracing pipeline 300 traverses to the children of that replaced oriented bounding box, testing the ray for intersection against those children, their children, and so on.

In an example of this approach, the traversal paradigm is modified to traverse into the subtree if the ray intersects any of the multiple axis-oriented bounding boxes (e.g., axis-aligned bounding boxes 705a, 705b, 705c, 705d and 705e). This paradigm relaxes the requirement of a single axis-aligned bounding box (e.g., box 702) which conservatively covers the primitive in every dimension, and replaces it with the requirement that a set of smaller axis-aligned bounding boxes conservatively cover the subtree.

A given oriented bounding box can be translated into N axis-aligned bounding boxes where N is chosen to minimize the representation error, e.g., below an arbitrary threshold. In other words, the number of boxes chosen to represent an oriented bounding box These N axis-aligned bounding boxes have the property that if a ray intersection test hits any of them, traversal will continue into the single subtree originally represented by the oriented bounding box. In some implementations, when intersection unit 304 processes these N axis-aligned bounding boxes, the intersection unit 304 skips all remaining axis-aligned bounding volume intersection tests after the first successful hit.

In one example, each oriented bounding box of an already-built BVH that includes oriented bounding boxes is translated into multiple axis-aligned bounding boxes at run time. For example, a dedicated hardware unit (such as the intersection test unit 304) could perform this translation at run-time, feeding the results to intersection test unit 304. In another example, prior to run time, a bounding volume hierarchy builder (which can be implemented in hardware, software, or a combination thereof) can be used to translate a bounding volume hierarchy comprised of oriented bounding boxes into a bounding volume hierarchy formed purely of axis-aligned bounding boxes, where multiple axis-aligned bounding boxes are used to emulate each oriented bounding box. In still further example, a bounding volume hierarchy builder can be used to translate a bounding volume hierarchy comprised of both oriented bounding boxes and axis-aligned bounding boxes into a bounding volume hierarchy formed purely of axis-aligned bounding boxes, again with multiple axis-aligned bounding boxes being used to emulate each oriented bounding box.

In still further examples, oriented bounding boxes can be represented using multiple cubes or multiple anisotropic rectangles, as well as spheres, cones, frustums, or other regular shapes or volumes.

As stated, a bounding box conversion unit such as the intersection test unit 304 or a hardware or software BVH builder converts oriented bounding boxes to axis-aligned bounding boxes. In some examples, the bounding box conversion unit generates the axis-aligned bounding boxes in the following way. The bounding box conversion unit selects two endpoints at different ends of the oriented bounding box and generates one axis aligned bounding box for each such endpoint. Each endpoint can sit on the face of the OBB or can be offset from that face by an amount. The bounding box conversion unit generates multiple additional evenly spaced center points for additional axis aligned bounding boxes and generates those additional bounding boxes at those center points. The size of the axis-aligned bounding boxes is sufficient to cover the entire volume of the oriented bounding box.

Figure 8:
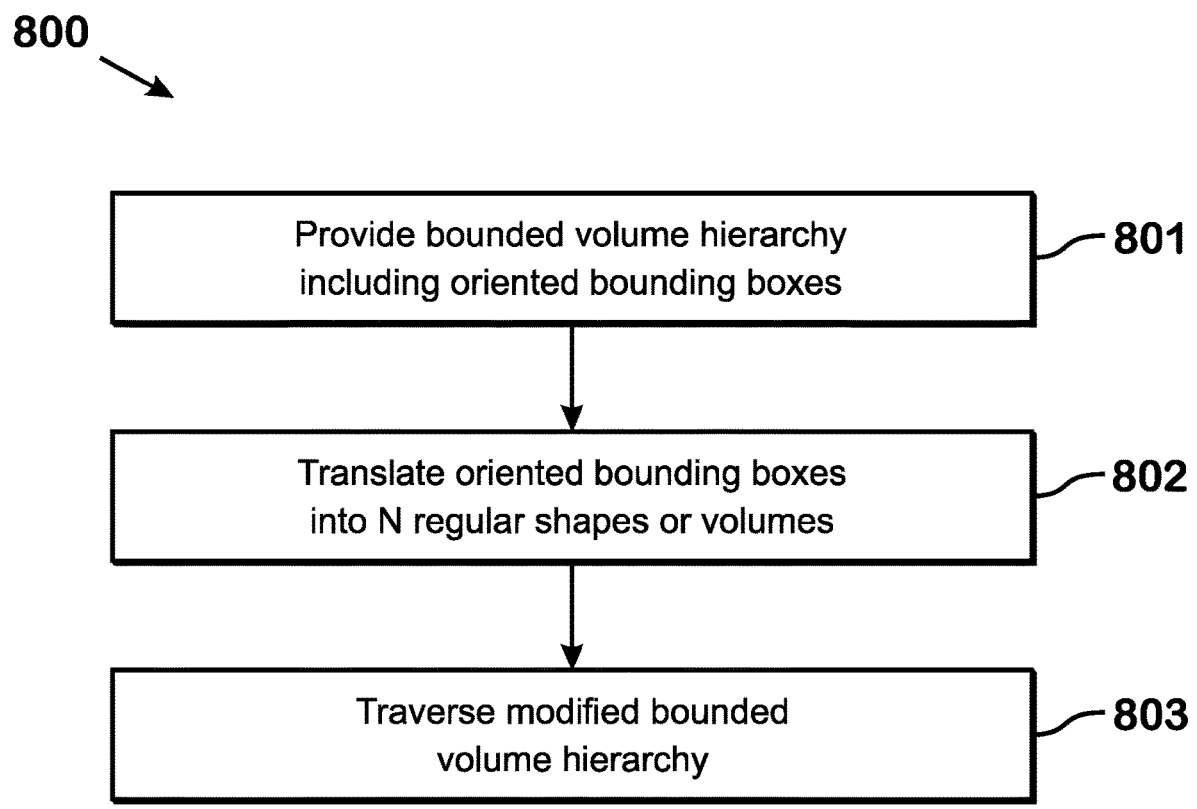
FIG. 8 illustrates a flow diagram of a method for emulation of an oriented bounding box, according to an example.

FIG. 8 is a flow diagram of a method 800 for emulation of an oriented bounding box using regular shapes or volumes, such as axis-aligned bounding boxes, according to an example. Although described with respect to the systems of FIGS. 1-7A-C, those of skill in the art will understand that any system, configured to perform the steps of the method 800 in any technically feasible order, falls within the scope of the present disclosure.

At step 801 a bounding volume hierarchy comprising a plurality of oriented bounding boxes is provided. At step 802, the oriented bounding boxes are emulated by translating each oriented bounding box into N regular shapes or volumes, wherein N is greater than 1. In some examples, the regular shapes or volumes comprise axis-aligned bounding boxes, cubes or anisotropic rectangles. In one example, the emulating step is performed at run-time using dedicated hardware. At step 803, the bounding volume hierarchy is traversed.

Each of the units illustrated in the figures represent hardware circuitry configured to perform the operations described herein, software configured to perform the operations described herein, or a combination of software and hardware configured to perform the steps described herein. For example, the ray tracing pipeline 300, ray generation shader 302, any hit shader 306, hit or miss unit 308, miss shader 312, closest hit shader 310, and acceleration structure traversal stage 304 are implemented fully in hardware, fully in software executing on processing units (such as compute units 132), or as a combination thereof. In some examples, the acceleration structure traversal stage 304 is partially implemented as hardware and partially as software. In some examples, the portion of the acceleration structure traversal stage 304 that traverses the bounding volume hierarchy is software executing on a processor and the portion of the acceleration structure traversal stage 304 that performs the ray-box intersection tests and ray-triangle intersection tests is implemented in hardware.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing operations, the method comprising:
   providing a bounding volume hierarchy which comprises a plurality of oriented bounding boxes;
   emulating the plurality of oriented bounding boxes by translating each oriented bounding box into two or more regular shapes representing the oriented bounding box; and
   traversing the bounding volume hierarchy, the traversing including testing a ray for intersection with two or more regular shapes representing an oriented bounding box and traversing to a child of the oriented bounding box in response to detecting that the ray intersects any of the two or more regular shapes.

2. The method of claim 1, where the number of regular shapes is chosen to minimize a representation error.

3. The method of claim 2, wherein the regular shapes or volumes comprise axis-aligned bounding boxes.

4. The method of claim 2, wherein the regular shapes comprise cubes or anisotropic rectangles.

5. The method of claim 1, wherein the emulating step is performed at run time.

6. The method of claim 5, wherein the emulating step is performed by an intersection test unit.

7. The method of claim 1, wherein the emulating step is performed prior to run time by translating a bounding volume hierarchy comprised of oriented bounding boxes into a bounding volume hierarchy formed purely of regular shapes or volumes, wherein multiple regular shapes or volumes are used to emulate each oriented bounding box.

8. The method of claim 7, wherein multiple axis-aligned bounding boxes are used to emulate each oriented bounding box.

9. The method of claim 7, wherein, prior to the translating step, the bounding volume hierarchy is comprised of both oriented bounding boxes and axis-aligned bounding boxes.

10. The method of claim 1, wherein during the traversing step, if a ray intersection occurs with any of the regular shapes corresponding to an oriented bounding box, traversal continues into a single subtree originally associated with the oriented bounding box.

11. The method of claim 10, wherein during the traversing step, upon a single occurrence of a ray intersection with any of the regular shapes corresponding to an oriented bounding box, any remaining intersection test for the regular shapes corresponding to the oriented bounding box is skipped.

12. A system for performing ray tracing operations, the system comprising:
a memory configured to store a bounding volume hierarchy which comprises a plurality of oriented bounding boxes; and
a processor configured to perform operations including:
emulating the plurality of oriented bounding boxes by translating each oriented bounding box into two or more regular shapes representing the oriented bounding box; and
after the emulating, traversing the bounding volume hierarchy, the traversing including traversing to a child of an oriented bounding box in response to detecting that a ray intersects any of the two or more regular shapes representing the oriented bounding box.

13. The system of claim 12, where the number of regular shapes is chosen to minimize a representation error.

14. The system of claim 13, wherein the regular shapes comprise axis-aligned bounding boxes.

15. The system of claim 13, wherein the regular shapes comprise cubes or anisotropic rectangles.

16. The system of claim 12, wherein the emulating step is performed at run time.

17. The system of claim 16, further comprising a dedicated hardware unit that performs wherein the emulating and provides results to an intersection test unit.

18. The system of claim 12, wherein during the traversing step, if a ray intersection occurs with any of the regular shapes corresponding to an oriented bounding box, traversal continues into a single subtree originally represented by the oriented bounding box.

19. The system of claim 18, wherein during the traversing step, upon a single occurrence of a ray intersection with any of the regular shapes corresponding to an oriented bounding box, any remaining intersection test for the regular shapes or volumes corresponding to the oriented bounding box is skipped.

20. A non-transitory computer-readable medium storing instructions that, when executed by a processor, cause the processor to perform operations comprising:
providing a bounding volume hierarchy which comprises a plurality of oriented bounding boxes;
emulating the plurality of oriented bounding boxes by translating each oriented bounding box into two or more regular shapes representing the oriented bounding box; and
after the emulating step, traversing the bounding volume hierarchy, the traversing including traversing to a child of an oriented bounding box in response to detecting that a ray intersects any of the two or more regular shapes representing the oriented bounding box.

* * * * *